United States Patent [19]

Seitz et al.

[11] Patent Number: 5,498,382
[45] Date of Patent: Mar. 12, 1996

[54] PROCESS FOR CONVERTING WATER SENSITIVE CERAMIC POWDERS INTO A FREE FLOWING GRANULATED POWDER

[75] Inventors: Katherina Seitz, Frankfurt am Main; Hans-Michael Güther, Kelkheim/Taunus; Friedrich Hessel, Mainz; Frank Schröder, Hürth; Christine Köstler, Bad Soden am Taunus; Andreas Roosen, Hofheim/Taunus; Christian May, Erftstadt, all of Germany

[73] Assignee: Hoechst Aktiengesellschaft, Frankfurt am Main, Germany

[21] Appl. No.: 117,830

[22] Filed: Sep. 8, 1993

[30] Foreign Application Priority Data

Sep. 8, 1992 [DE] Germany ............... 42 30 016.9

[51] Int. Cl.⁶ ............... C04B 35/622; B29B 9/00
[52] U.S. Cl. ............... 264/56; 264/6; 264/7; 264/12; 264/61; 264/63
[58] Field of Search ............... 264/5, 7, 117, 264/56, 61, 63

[56] References Cited

U.S. PATENT DOCUMENTS

| | | | |
|---|---|---|---|
| 4,401,366 | 8/1983 | Hope | 385/113 X |
| 4,978,465 | 12/1990 | Sturwold | 252/48.6 X |
| 5,175,051 | 12/1992 | Schloegl et al. | 428/323 |
| 5,182,239 | 1/1993 | Hirokawa et al. | 501/98 |
| 5,288,806 | 2/1994 | Peacock | 525/240 |

FOREIGN PATENT DOCUMENTS

| | | |
|---|---|---|
| 0424094 | 4/1991 | European Pat. Off. . |
| 4119695 | 12/1991 | Germany . |

OTHER PUBLICATIONS

Chemical Abstracts, vol. 11, No. 6, Aug. 7, 1989, abstract No. 44266f, Nakamura "Free Flowing granulated aluminum nitride powder for press molding" & JP-A-1061632, Mar. 8, 1989.

Database WPI, Section CH, Week 8928, Derwent Publications Ltd. Class A81, AN 89-203080 & JP-A-1 141 865 (Mitsubishi Mining Cement) Jun. 2, 1989.

Database WPI, Section CH, Week 8916, Derwent Publications Ltd., Class E33, AN 89-117143, & JP-A-1061304 (Denki Kagaku Kogyo KK) Mar. 8, 1989.

Chemical Abstracts, vol. 108, No. 8, Feb. 22, 1988, Columbus, Ohio, Abstract No. 61239e, Uno Naoki & Al. "Surface treatment of aluminum nitride powder . . . ", JP-A-62207770, Sep. 12, 1987.

Patent Abstracts of Japan, vol. 013, No. 021 (C-560), Jan. 18, 1989 & JP-A-63 225 507 Sep. 1988.

Database Inspec, Institute of Electrical Engineers, No. 4014683, Egashira et al. "Chemical surface treatments of aluminum nitride powder suppressing its reactivity with water . . . ".

Von R. Heusch, Eine experimentelle Methode zur Bestimmung des HLB-Wertes von Tensiden; Jul. 7, 1969 pp. 31–38.

Primary Examiner—David A. Simmons
Assistant Examiner—M. Curtis Mayes
Attorney, Agent, or Firm—Foley & Lardner

[57] ABSTRACT

A water sensitive ceramic powder, in particular aluminum nitride, is provided with a hydrophobic coating. The coated powder is dispersed in water with addition of a binder and a nonionic surfactant from the group comprising ethylene oxide adducts with an HLB value of from 10 to 14. Subsequently the aqueous slip is converted into a free flowing granulated powder. The nonionic surfactant, which is added in an amount sufficient to give a monomolecular layer, makes possible a good dispersion of the hydrophobically coated powder in water.

17 Claims, No Drawings

PROCESS FOR CONVERTING WATER SENSITIVE CERAMIC POWDERS INTO A FREE FLOWING GRANULATED POWDER

FIELD OF THE INVENTION

The present invention relates to a process for converting water sensitive ceramic powders into a free flowing granulated powder, in which the water sensitive ceramic powder is provided with a hydrophobic coating. In particular the invention relates to a procedure for processing aluminum nitride powder.

DESCRIPTION OF RELATED ART

In the production of technical ceramic parts the ceramic powder is first processed before it is formed into a green body and the green body is sintered.

Fine powders are prone to agglomerate as a result of surface forces with or without chemical bonding, making the processing into a green body difficult or impossible, since the agglomerated powder is not free flowing and this leads to inhomogeneities in the microstructure of the sintered ceramic. Hence every production process for ceramic parts requires specific powder processing in which the powder is deagglomerated. A controlled agglomeration can subsequently be carried out in the powder processing to obtain a free flowing granulated powder with a desired specification. Free flowing granulated powders are used, for example, if the forming of the green body is by pressing.

If the green body is densified by pressureless liquid phase sintering, the processing of the powder also serves to distribute a sintering aid homogeneously in the ceramic powder.

One way of powder processing comprises wet milling in water with subsequent spray drying to give a free flowing granulated powder. In the case of water sensitive ceramic powders this processing can lead to undesired changes in the powder. For example, aluminum nitride powder is sensitive to hydrolysis. Aluminum nitride powder which has been produced directly from the elements is extremely sensitive to hydrolysis, but even the aluminum nitride powder produced by the carbothermic process undergoes hydrolysis on prolonged contact with water. The hydrolysis leads to a substantial reduction in the thermal conductivity of the aluminum nitride ceramic. Since aluminum nitride ceramic, because of its very good thermal conductivity, is finding increasing application in electronics, for example as substrate material in microelectronics, hydrolysis must be prevented in the production process of parts made of aluminum nitride powder.

One way of preventing the hydrolysis of aluminum nitride powder during processing comprises the use of organic dispersants for powder processing. However organic dispersants have the disadvantage that they are harmful to health and/or the environment, or form explosive mixtures with air.

Another possibility is to coat the aluminum nitride powder in order to avoid direct contact between powder and water during powder processing. However the coated powder, coated for example with polymers or fatty acids, cannot be dispersed in water, or can be dispersed only with difficulty. Other coatings can give problems during burnout or sintering, if relatively large amounts of these additives need to be removed.

The use of spray drying in the production of granulated powder makes possible a narrow granule size distribution, which then makes possible higher densification gradients and higher dimensional accuracy during the subsequent production of the parts. In many cases it is therefore desirable to use spray drying in the processing.

SUMMARY OF THE INVENTION

An object of the present invention is to provide a process of the abovementioned type, in which the powder provided with a hydrophobic coating can be dispersed in water and converted into a free flowing granulated material by spray drying. In particular it is intended to provide a procedure for processing aluminum nitride powder which both prevents hydrolysis and allows working in an aqueous medium.

This object is achieved on the basis of the abovementioned process when the powder provided with a hydrophobic coating is dispersed in water with addition of a binder and a nonionic surfactant from the group comprising ethylene oxide adducts with an HLB value of from 10 to 14 in an amount sufficient to give a monomolecular layer on the powder, and is converted into a free flowing granulated powder by spray drying.

DETAILED DESCRIPTION

The process of the invention enables ceramic powders stabilized by a hydrophobic coating to be readily dispersed in water. A stable aqueous slip can be prepared, which can be converted by spray drying into a free flowing granulated powder with a desired average granule size in the range of from 20 to 500 µm, in particular from 50 to 250 µm, and with a narrow granule size distribution and a good shelf life. The surfactants added according to the invention not only have a good dispersing effect, but are also characterized by a low tendency to foaming.

The process of the invention is particularly suitable for nonoxide ceramic powders and preferably for aluminum nitride powder. The process of the invention enables processing of aluminum nitride powder prepared both by the carbothermic process and directly from the elements.

The granulated powder produced by the process of the invention can be dry pressed by conventional methods to form a green body which is subsequently densified, to give the ceramic part, by subsequent sintering, for example in a nitrogen atmosphere at about 1850° C. Processing according to the invention gives granulated powders from which green and sintered bodies with minimal impurities can be produced. In the case of aluminum nitride, parts with a high thermal conductivity of above 150 W/mK are obtained.

If a sintering aid is added to the ceramic powder this is preferably, together with the ceramic powder, provided with a hydrophobic coating. Possible sintering aids are, for example, oxides of the rare earth metals, in particular yttrium oxide ($Y_2O_3$).

The ceramic powder and any sintering aid used can be coated with polymers by in-situ polymerization or by coating from an organic solution. In the process of the invention the ceramic powder is preferably coated with fatty acids, their salts or derivatives, for example amines. Fatty acids having from 10 to 26 carbon atoms can be used, in which case the fatty acids may be saturated or unsaturated, linear or branched. Fatty acids with from 14 to 20 carbon atoms or their salts and derivatives are preferred, in particular stearic acid and palmitic acid. They are dissolved in an organic solvent, for example isopropanol, toluene or n-hexane, and applied to the ceramic powder from this solution. The mixture is well homogenized and the solvent is subsequently removed.

The conventional ceramic powders have a specific surface area of from 1 to 10 $m^2/g$ and particle sizes of from 0.5 to 5 µm, in particular from 1.0 to 2.0 µm. The abovementioned materials for forming the hydrophobic coating are used in an amount sufficient to coat the surface of the ceramic powder and any sintering aid used. Depending on the specific surface area of the ceramic powder used, the materials are used in amounts of from 0.5 to 5% by weight, based on the ceramic powder or on the mixture of ceramic powder and sintering aid.

The powder provided with the hydrophobic coating is then dispersed in water with the aid of specific surfactants together with a binder and if desired with pressing aids.

The nonionic surfactants from the group comprising ethylene oxide adducts are preferably alkylphenol polyglycol ethers, fatty alcohol polyglycol ethers and fatty acid polyglycol esters. Particularly preferred are alkylphenol polyglycol ethers and in particular tributylphenol polyglycol ether.

The surfactants must have an HLB value of from 10 to 14. The HLB value is the measure of the relative water and oil solubility of the nonionic surfactant. It is determined in accordance with the method given for nonionic surfactants in R. Heusch, Kolloid-Zeitschrift, Fig. 236, p. 31 ff (1970). Nonionic surfactants with an HLB value of from 12 to 13 are preferred.

The surfactants are used in an amount sufficient to give a monomolecular layer on the hydrophobe-coated powder. The amount of surfactant required increases with increasing specific surface area of the powder. The amount of added surfactant should not be too high as this then greatly increases the viscosity of the slip. For ceramic powders with a specific surface area of from 1 to 10 $m^2/g$ the nonionic surfactants are preferably used in an amount of from 0.1 to 0.5% by weight, based on the powder provided with the hydrophobic coating (ceramic powder and any sintering aid).

Binders which can be used are water soluble binders such as polyvinyl alcohol, cellulose derivatives or polyester modified polyurethane resins or polymer dispersions based on acrylates/methacrylates. The binders preferably have a low solution viscosity and low moisture absorption so as to give a granulated material having a good shelf life. The binder is generally added in an amount such that the binder content is from 3 to 5% by weight, based on the solids content of the mixture. In addition to the binder, pressing aids such as oleic acid, polyethylene glycol or waxes may be included as further additives.

The invention is illustrated by the examples below.

EXAMPLE 1

Coating 5 g (=1% by weight) of stearic acid are dissolved in 1 l of isopropanol. A mixture of 475 g of AlN powder (particle size 1.4 µm, BET 3.2 $m^2/g$) and 25 g of $Y_2O_3$ is then added and the whole is homogenized in an ultrasonic bath for 10 min. The solvent is subsequently distilled off in a rotary evaporator. The coated powder obtained is further dried in a drying cabinet at 110° C.

EXAMPLE 2

Coating

The procedure described in Example 1 is repeated, with the exception that 0.5% by weight of stearic acid is used instead of 1% by weight.

EXAMPLE 3

Coating

The procedure described in Example 1 is repeated, with the exception that 5% by weight of stearic acid are used instead of 1% by weight.

COMPARATIVE EXAMPLE 1

Coating

The procedure described in Example 1 is repeated, with the exception that 0.3% by weight of stearic acid is used instead of 1% by weight.

EXAMPLE 4

Test of Stability to Hydrolysis 10 g of the AlN/$Y_2O_3$ powder, with a coating of 0.3% by weight, obtained in Comparative Example 1 are vigorously stirred in 100 ml of water. After 10 minutes an increasing smell of $NH_3$ can be detected; the powder is being increasingly decomposed.

EXAMPLE 5

Test of Stability to Hydrolysis 10 g of the AlN/$Y_2O_3$ powder, with a coating of 0.5, 1.0 or 5% by weight of stearic acid, obtained in Examples 1 to 3 are in each case vigorously stirred in 100 ml of water. After 20 minutes no smell of $NH_3$ can be detected. All three powders are not wetted by water.

EXAMPLE 6

Slip Preparation 300 ml of water, 0.54 g (=0.3% by weight) of tributylphenol polyglycol ether with an HLB value of 12 (Sapogenat® T 100, produced by Hoechst AG) and 1 kg of milling media are premixed in a ball mill. 180 g of the AlN/$Y_2O_3$ powder, with a coating of 1% by weight of stearic acid, obtained in Example 1 are then added and the contents mixed for 20 min. A stable slip having a low viscosity of 6 mPa.s, measured with a rotary viscometer from Haake, is obtained.

COMPARATIVE EXAMPLE 2

Slip Preparation

A slip is prepared as described in Example 6 from the coated AlN/$Y_2O_3$ powder obtained in Example 1, but using only 0.05% by weight of the tributylphenol polyglycol ether with an HLB value of 12 (Sapogenat® T 100). The slip obtained is inhomogeneous; the powder is insufficiently wetted.

COMPARATIVE EXAMPLE 3

Slip Preparation

A slip is prepared as described in Example 6 from the coated AlN/$Y_2O_3$ powder obtained in Example 1, but using 0.3% by weight of tributylphenol polyglycol ether with an HLB value of 8 (Sapogenat® T 040, produced by Hoechst AG). The slip obtained is inhomogeneous; the powder is being insufficiently wetted.

COMPARATIVE EXAMPLE 4

Slip Preparation

A slip is prepared as described in Example 6 from the coated $AlN/Y_2O_3$ powder obtained in Example 1, but using 0.3% by weight of tributylphenol polyglycol ether with an HLB value of 16 (Sapogenat® T 180, produced by Hoechst AG). An inhomogeneous slip is obtained; the powder is being insufficiently wetted.

EXAMPLE 7

Production of a Part 200 g of the $AlN/Y_2O_3$ powder, with a coating of 1% by weight of stearic acid, obtained in Example 1, 1.2 g of tributylphenol polyglycol ether with an HLB value of 12 (Sapogenat® T 100, produced by Hoechst AG) and 4.4 g of a polyester modified polyurethane resin (Daotan® VTW 1226, produced by Hoechst AG), which is added in the form of 10.9 g of a 40% strength aqueous solution, are mixed with milling media in a total of 134 g of water in a ball mill, until a homogeneous slip is obtained.

The slip is converted into a granulated powder ($d_{50}$-70 µm) in a spray drier. 5 g of the granulated powder are filled into a die and pressed to give a tablet-shaped green body under a pressure of 1000 bar. The green body is subsequently sintered for three hours at 1840° C. in a nitrogen atmosphere. The part obtained has a thermal conductivity of 160 W/mK.

What is claimed is:

1. A process for converting water sensitive ceramic powders into a free flowing granulated powder, comprising:
   (a) providing the water sensitive ceramic powder with a hydrophobic coating;
   (b) dispersing said water sensitive ceramic powder of step (a) in water with addition of a binder and a nonionic surfactant selected from the group consisting of alkylphenol polyglycol ethers, fatty alcohol polyglycol ethers, fatty acid polyglycol esters and mixtures thereof with an HLB value within the range from 10 to 14 in an amount sufficient to form a monomolecular layer on the powder; and
   (c) converting the product of step (b) into a free flowing granulated powder by spray drying.

2. Process as claimed in claim 1, wherein the water sensitive ceramic powder is a nonoxide ceramic powder.

3. Process as claimed in claim 2, wherein the nonoxide ceramic powder is aluminum nitride powder.

4. Process as claimed in claim 3, wherein the aluminum nitride powder, together with a sintering aid, is provided with a hydrophobic coating.

5. Process according to claim 4 wherein the sintering aid is yttrium oxide.

6. Process as claimed in claim 2, wherein the nonoxide ceramic powder, together with a sintering aid, is provided with a hydrophobic coating.

7. Process as claimed in claim 1, wherein the nonionic surfactant has an HLB value within the range from 12 to 13.

8. Process as claimed in claim 1, wherein the nonionic surfactant is tributylphenol polyglycol ether.

9. Process as claimed in claim 1, wherein the nonionic surfactant is added in an amount from 0.1 to 0.5% by weight, calculated on total weight of the powder provided with the hydrophobic coating.

10. Process as claimed in claim 1, wherein the hydrophobic coating comprises a fatty acid having from 10 to 20 carbon atoms.

11. Process as claimed in claim 10, wherein the fatty acid is stearic acid.

12. Process as claimed in claim 10, wherein the fatty acid is palmitic acid.

13. Process as claimed in claim 1, wherein the material used for the hydrophobic coating is used in an amount of from 0.5 to 5% by weight, calculated on total weight of powder to be coated.

14. The process as claimed in claim 1, wherein said water sensitive ceramic powder is provided with a hydrophobic coating by first dissolving a fatty acid having from 10 to 26 carbon atoms in an organic solvent, and then adding to this solution said water sensitive ceramic powder.

15. The process as claimed in claim 14, wherein from 0.5 to 5% by weight of said fatty acid is used, based on the weight of the water sensitive ceramic powder.

16. The process as claimed in claim 15, wherein the water sensitive ceramic powder and a sintering aid are coated with said hydrophobic coating.

17. A process of making a ceramic material comprising:
   (a) dry pressing the free flowing granulated powder water sensitive ceramic material of claim 1 to form a green body; and
   (b) sintering said green body.

* * * * *